United States Patent [19]
Kerscher et al.

[11] 4,299,508
[45] Nov. 10, 1981

[54] CONNECTORS FOR THE CONSTRUCTION OF HOLLOW TUBE MOUNTING FRAMEWORKS

[75] Inventors: Franz Kerscher, Munich; Guenther Schaffer, Augsburg, both of Fed. Rep. of Germany

[73] Assignee: Siemens Aktiengesellschaft, Berlin & Munich, Fed. Rep. of Germany

[21] Appl. No.: 129,391

[22] Filed: Mar. 11, 1980

[30] Foreign Application Priority Data

Mar. 22, 1979 [DE] Fed. Rep. of Germany ....... 2911330

[51] Int. Cl.³ ............................................. F16B 7/00
[52] U.S. Cl. .................................. 403/172; 403/295; 403/267
[58] Field of Search ............... 403/268, 265, 295, 292, 403/171, 176, 298, 37, 267, 266, 172, 34, 293, 297, 15

[56] References Cited

U.S. PATENT DOCUMENTS

| 119,232 | 9/1871 | Jones | 403/268 |
| 1,516,975 | 11/1924 | McArthur | 403/268 |
| 1,785,587 | 12/1930 | Kuhlmann | 403/265 |
| 2,263,198 | 11/1941 | Valiton | 403/265 |
| 2,678,853 | 5/1954 | Reeder | 403/265 |
| 3,299,840 | 11/1967 | Schultz | 403/295 |
| 3,881,830 | 5/1975 | Kato | 403/295 |
| 4,076,432 | 2/1978 | Glaser | 403/295 |

FOREIGN PATENT DOCUMENTS 521898  3/1955  Italy .................................. 403/171

Primary Examiner—Andrew V. Kundrat
Attorney, Agent, or Firm—Hill, Van Santen, Steadman, Chiara & Simpson

[57] ABSTRACT

A connector is disclosed for the construction of a framework used in electrical communication engineering. At least two connection pieces are employed at a junction. Each connection piece has adhesive grooves within which glue flows. These connection pieces fit into hollow tubes to be joined and which are thereby glued together. Trapping of air bubbles during the introduction of glue is avoided by providing at least one central groove around a periphery of each connection piece and from which branching grooves extend. Also, an apertured disk can be slipped onto the connection pieces to prevent exiting of the adhesive and thereby insure a further improvement in adhesive distribution. A gap is also provided for release of trapped air.

5 Claims, 6 Drawing Figures

4,299,508

CONNECTORS FOR THE CONSTRUCTION OF HOLLOW TUBE MOUNTING FRAMEWORKS

BACKGROUND OF THE INVENTION

The invention concerns a connector for the construction of hollow tube mounting frameworks for electrical communications engineering, especially data processing engineering, and wherein at least two connection pieces are employed at a knot or point of intersection. These connection pieces are provided with adhesion grooves which are provided in the hollow tubes and are glued together thereby.

The previously known frameworks or structures consist of rectangular tubes which are welded together with one another. Nevertheless, welding has the disadvantage that because of the heat which arises, the frameworks become warped. Simultaneously, the metal coating which inhibits corrosion is damaged. A further disadvantage of the welding method is that in the case of a zinc-chromatized surface, during welding poisonous vapors arise. Besides this, the welding requires an expensive after-treatment because of the burnt welding zones.

For this reason, it is already known to glue together the individual rectangular tubes at their corners via so-called corner knots (corner points or intersection). These corner knots or junctions thereby represent connectors which have a point of intersection from which, for example, three connection pieces which lie perpendicular to one another extend. They preferably consist of metal, for example, of aluminum. These corner knots are then inserted into the hollow tubes and are glued together with ease. Therefore, adhesion grooves which encircle the connection piece surfaces are provided which are connected with one another via two longitudinal grooves. With spraying-in of the adhesive, first the adhesion groove fills, and only thereafter does the adhesive move into the adhesion crevice from all sides. The air is thereby trapped upon the adhesion surface and approximately 30% of the adhesion surface remains without moistening, or respectively, without adhesive filling. The adhesive connection must therefore be designed larger, that is, the leg length of the individual corner knots must be enlarged.

SUMMARY OF THE INVENTION

It is an object of the present invention to create a connector by means of which air trapped between the hollow tube and the connector during the gluing are avoided to a large extent.

For solving this problem, according to the invention the connector for hollow tube frameworks is designed such that the adhesion grooves consist of at least one central groove which encircles the surface of the connection pieces and from which branching grooves proceed.

By means of these techniques, a significantly more uniform distribution of the adhesive is attained which leads to a more stable construction with reduction in size of the legs of the corner knots or junctions. Besides this, the coatings which project against corrosion are not damaged. Also, there is a significant freedom of selection for the material of the coating, since the poisonous vapors which can arise in the case of welding do not have to be considered. The concrete design of the adhesion grooves leads to the fact that the air can flow out in a gap or opening between the connector and hollow tube inner surface toward the ends of the hollow tube during construction under pressure.

At least two connection pieces can be positioned perpendicular to one another so that with this construction, simple frameworks can be manufactured out of hollow tubes.

One attains a more favorable adhesive distribution if a punched or apertured disk with narrow tolerance is slipped on each of the connection pieces of the connector before the gluing. These punched disks inhibit the exit of the adhesive.

The connection pieces can have a rectangular cross-sectional shape. It is advantageous to provide at least one branching disk perpendicular to the central groove on each side of the rectangular hollow tube.

BRIEF DESCRIPTION OF THE DRAWINGS

FIG. 4 shows a detail of the connector with a punched disk which has been slipped on.

DESCRIPTION OF THE PREFERRED EMBODIMENTS

Figure 1A:
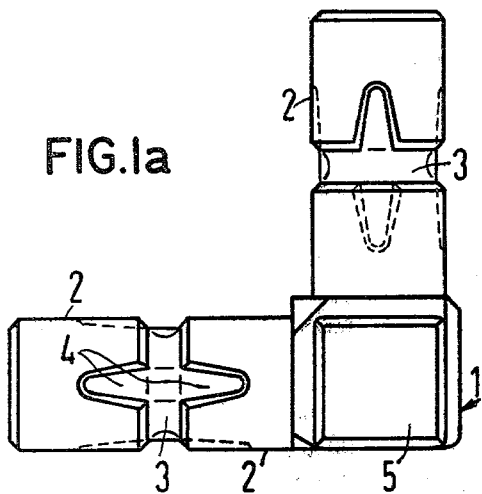
FIGS. 1a, b, c shows the front, side and top views respectively of a three legged corner connector.
Figure 1B:
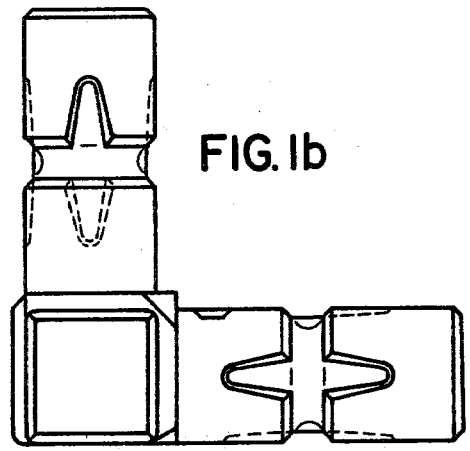
Figure 1C:
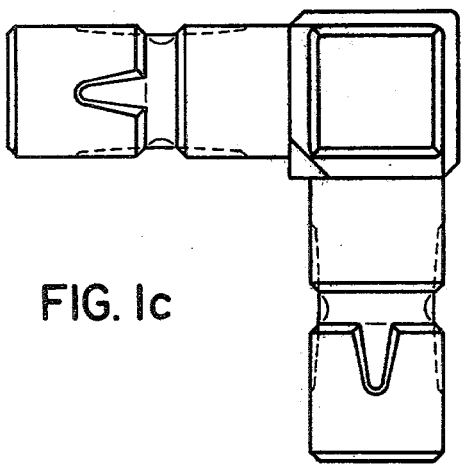

The connector 1 in FIG. 1 consists of a knot or (point of intersection) 5 from which connection pieces 2 proceed and which are positioned perpendicular to one another in three dimensions. Each of these connection pieces is provided with a central adhesion groove 3, from which at least one branching adhesion groove 4 proceeds. Accordingly, a rectangular embodiment of a connector of this sort is shown, whereby the connector in the present case consists of metal, namely of aluminum. However, one is not restricted to this material, but rather these connectors can be manufactured out of any random type of metal or also out of synthetic material. Besides this, the connectors can also contain only two connection pieces which lie in one plane, so that no corner connection is provided; however, an edgeless connection of two hollow tubes with one another is possible. FIG. 1a shows the front view, FIG. 1b the side view, and FIG. 1c the top view.

Figure 2:
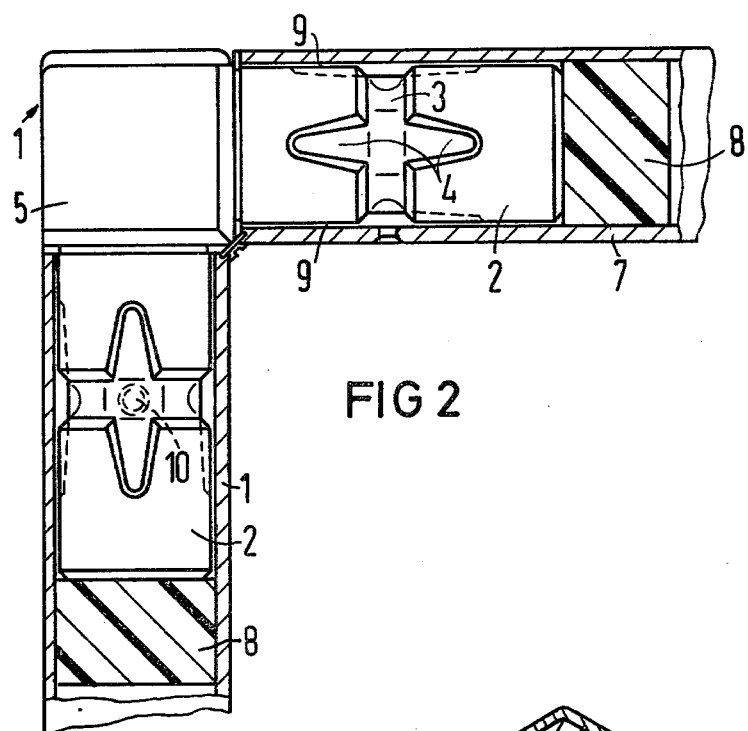
FIG. 2 shows the side view of a connector of this type, which is already introduced into hollow tubes glued together thereby.

FIG. 2 shows in front view a connector which has been glued into rectangular tubes whereby a cross-section is shown through the adhesion groove which exists between a connector of this sort and the hollow tube surface in each case. For decreasing the escape of the adhesive, the hollow tube in each case is closed off with a foam protective material seal 8. Between the inner wall of the rectangular tube 7 and each of the connector pieces outer wall is an adhesion gap or spacing 9. The supplying of adhesive for the adhesion grooves 3,4 proceeds via an opening 10. The adhesive is thereby introduced under pressure at a height of the central groove, whereby first this central adhesion groove 3 fills with adhesive material. Following, this, the adhesive material is distributed via the branching adhesion grooves 4 uniformly and to the adhesion gap 9. Therefore, the air can flow off in the gap 9 toward the ends of the tubes so that trapping of air bubbles is suppressed to a large extent.

Figure 3:
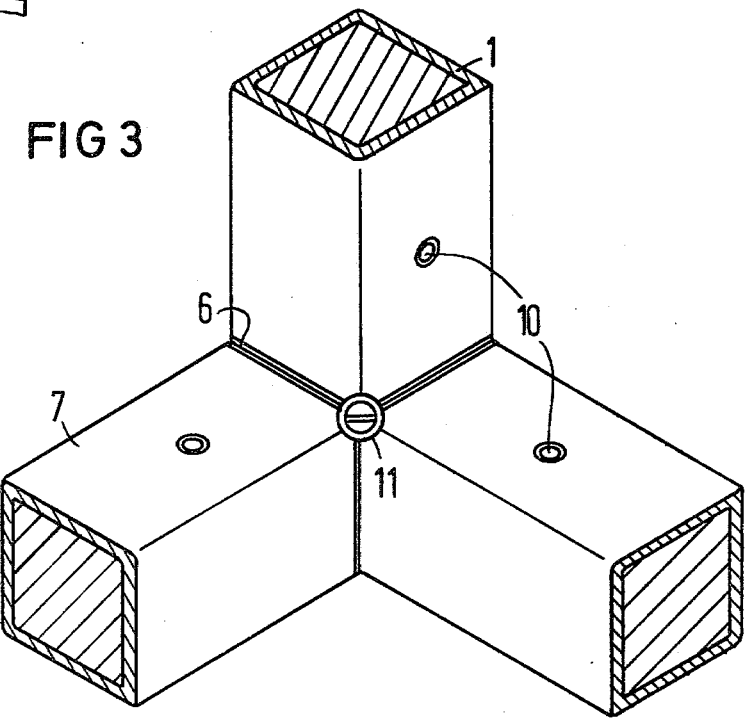
FIG. 3 shows a perspective view of a corner of a mounting framework which is constructed with a corner connector.

FIG. 3 shows a corner connection with the rectangular tubes 7, the corner connector 1 which is located in the tubes 7 and can only be seen in section, as well as the openings 10 which are provided for the supplying of adhesive. The screw 11 which is provided on the interior corner point of this corner connection serves electrical purposes.

Figure 4:
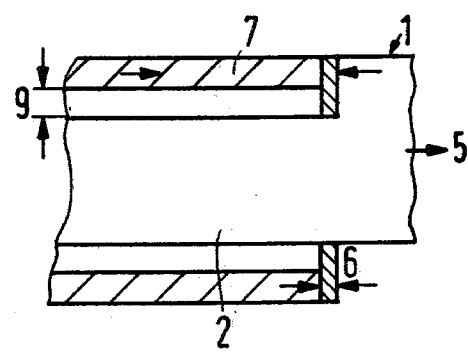

FIG. 4 shows a simplified enlarged sketch (not to scale), whereby an apertured disk 6 of narrow tolerance (also shown in FIG. 3) is slipped onto a connection piece 2 of the connection 1. This apertured disk prevents the exit of adhesive at the junction 5 of the connector 1, whereby a further improvement of the adhesive distribution in the adhesion grooves 3, 4 is attained.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A connector system for the construction of metal hollow tube mounting frameworks, comprising: metal hollow tubes for the framework; at least two metal connection pieces connected together at a point of intersection, said connection pieces each having adhesion glue accepting grooves on a periphery thereof which lie adjacent interior walls of the respective hollow tubes to be glued together to construct the framework; the adhesion grooves comprising at least one central groove which extends entirely around a periphery of the connection piece, and from this central groove branching grooves are directed outwardly therefrom along a portion of a length of each connection piece but which terminate before an end of the connection piece; a glue application aperture in the hollow tube positioned to align with the adhesion grooves; and a gap between the hollow tube inner surface and respective connection piece outer surface permitting air to escape out ends of the tube.

2. A connector system according to claim 1 wherein at least two of the connection pieces are positioned perpendicular to one another.

3. A connector system according to claim 1 wherein an apertured disk is slipped on with narrow tolerance over and around each connection piece to form an adhesive seal at the junction of the tube end with the connection piece.

4. A connector system according to claim 1 wherein the connection pieces have a rectangular cross-section and that upon each side of the rectangle at least one of said branching grooves is provided which extends perpendicularly to the central groove.

5. A connector system according to claim 1 wherein the glue application aperture is positioned over the central groove.

* * * * *